(No Model.)
J. KEERS & W. B. McLAUGHLIN.
AWNING FRAME.
No. 507,736. Patented Oct. 31, 1893.
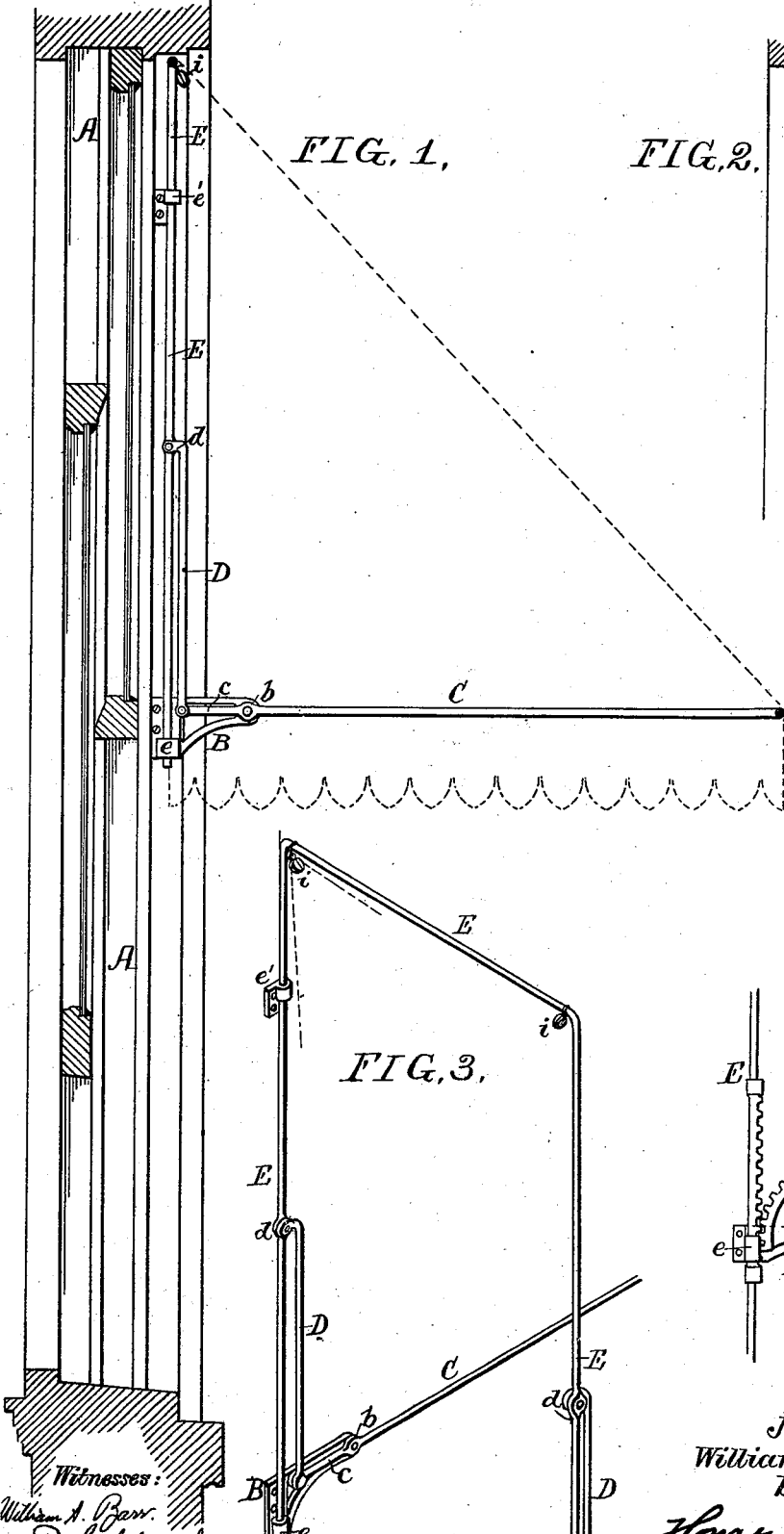
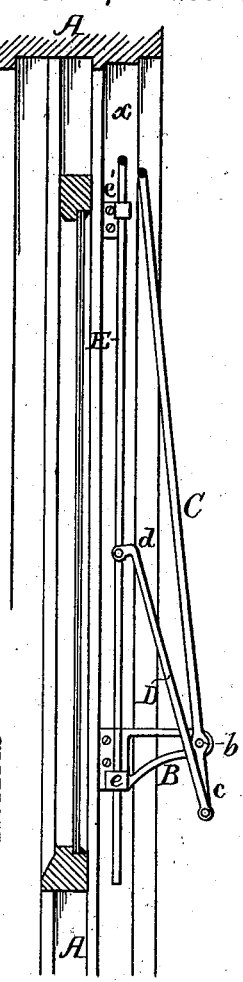
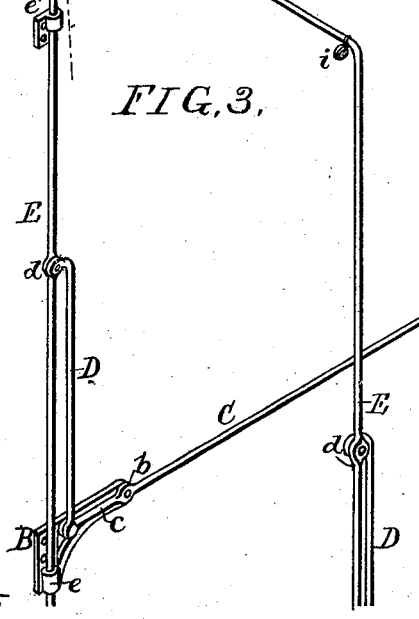
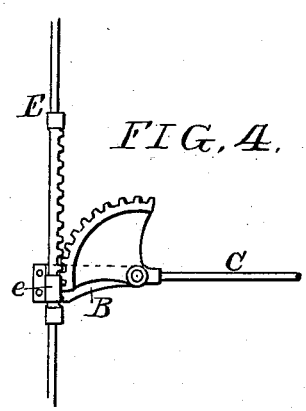
Witnesses:
William A. Barr.
R. Schleicher.
Inventors:
John Keers and
William B. McLaughlin
by their Attorneys
Howson & Howson

United States Patent Office.

JOHN KEERS AND WILLIAM B. McLAUGHLIN, OF PHILADELPHIA, PENNSYLVANIA.

AWNING-FRAME.

SPECIFICATION forming part of Letters Patent No. 507,736, dated October 31, 1893.

Application filed August 25, 1893. Serial No. 484,034. (No model.)

*To all whom it may concern:*

Be it known that we, JOHN KEERS and WILLIAM B. McLAUGHLIN, citizens of the United States, and residents of Philadelphia, Pennsylvania, have invented an Improved Awning-Frame, of which the following is a specification.

The object of our invention is to so construct an awning frame that when the awning is raised the upper edge of the awning will be lowered a certain distance to allow for ventilation. This object we attain in the following manner, reference being had to the accompanying drawings, in which—

Figure 1, is a sectional view of a window frame with the awning lowered. Fig. 2, is a sectional view of a window frame with the awning raised. Fig. 3, is a perspective view of the awning frame; and Fig 4, is a view of a modification.

A is the window frame to which is secured two brackets B, one at each side of the window and pivoted to these brackets is the frame C, preferably of iron. This frame has extensions $c$ back of the pivot $b$ and to these extensions are attached connecting rods D, which are pivoted at $d$ to the vertical frame E. This frame is adapted to slide in bearings $e, e'$ the lower bearings $e$ in the present instance forming part of the brackets.

The parts are so connected that when the frame C is lowered as in Fig. 1, the frame E will be raised to a point near or in contact with the upper portion of the window frame, so as to exclude the rays of the sun, but when the awning frame C is raised as in Fig. 2, the frame E will be lowered to allow a clear ventilating space $x$ between the frame of the window and the awning. The pulleys for the cords are attached at the upper corners of the frame E as indicated in Fig. 3 and the cords are attached to the outer end of the frame C in the ordinary manner; when the frame C is raised the fabric of the awning will be gathered into a small compass, thus preventing the obstruction of light by the awning when raised.

The frames instead of being connected by the connecting rod may be connected by a cord and a spring or weight used to force the vertical frame up in position when the frame C is lowered.

The frames may be connected as shown in Fig. 4, by a gear segment and rack, but we prefer the simple construction shown in Fig. 1.

It will be seen that an awning constructed as above will exclude the rays of the sun when the awning is down, but when the awning is up it will allow for the proper ventilation of the room by leaving a clear space above the awning; and when the sun is not shining into the window the space above will allow the light to enter the room above the awning as well as below.

We claim as our invention—

1. The combination of the pivoted awning frame C, the vertically sliding frame E, means for connecting the two frames together so that when the frame C is raised the frame E will be lowered, substantially as described.

2. The combination of the frame C, the brackets B to which the frame is pivoted, the sliding frame E, bearings therefor, and a rod connecting one frame to the other, substantially as specified.

3. The combination of the brackets, pivoted frame C having an extension $c$ beyond each pivot, a vertically sliding frame E, bearings therefor, with a rod D pivoted to the frame E and connected to the extension $c$ of the frame C, substantially as described.

4. The combination in an awning, of the vertically sliding frame E to which the upper end of awning is attached, a pivoted frame to which the lower end of the awning is attached said frames being connected so that when the pivoted frame is raised the sliding frame will be lowered, rope eyes carried by the sliding frame, cords or ropes passing through said eyes and attached to the pivoted frame so that when the awning is raised the space above the awning will be open and the fabric of the awning will be gathered, substantially as described.

In testimony whereof we have signed our names to this specification in the presence of two subscribing witnesses.

JOHN KEERS.
WILLIAM B. McLAUGHLIN.

Witnesses:
WILLIAM A. BARR,
HENRY HOWSON.